(12) United States Patent
Jeppsen et al.

(10) Patent No.: US 7,797,465 B2
(45) Date of Patent: Sep. 14, 2010

(54) APPARATUS AND METHODS TO REDUCE FRAME INTERRUPTS IN PACKET-BASED COMMUNICATION

(75) Inventors: Roger C. Jeppsen, Gilbert, AZ (US); Nathan Marushak, Gilbert, AZ (US); Brian J. Skerry, Gilbert, AZ (US); Jeffrey D. Skirvin, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 1391 days.

(21) Appl. No.: 11/150,781

(22) Filed: Jun. 10, 2005

(65) Prior Publication Data

US 2006/0282526 A1 Dec. 14, 2006

(51) Int. Cl.
G06F 13/00 (2006.01)
G06F 13/24 (2006.01)

(52) U.S. Cl. ............... 710/33; 710/34; 710/260; 710/262

(58) Field of Classification Search ........... 709/212, 709/223, 224; 710/1, 5, 30, 33, 34, 260, 710/262, 268
See application file for complete search history.

(56) References Cited

U.S. PATENT DOCUMENTS

| | | | |
|---|---|---|---|
| 5,313,582 A | 5/1994 | Hendel | |
| 5,588,000 A * | 12/1996 | Rickard | ............ 370/428 |
| 5,948,060 A * | 9/1999 | Gregg et al. | ............ 709/212 |
| 2002/0191621 A1 | 12/2002 | Jha | |
| 2003/0200368 A1 | 10/2003 | Musumeci et al. | |
| 2004/0006636 A1 | 1/2004 | Oesterreicher | |
| 2004/0095888 A1 | 5/2004 | Noel, Jr. | |

FOREIGN PATENT DOCUMENTS

| | | |
|---|---|---|
| TW | 220615 | 8/2004 |
| TW | 229992 | 3/2005 |
| TW | 200307421 | 3/2007 |

OTHER PUBLICATIONS

"International Search Report for corresponding PCT Application No. PCT/US2006/022198", (Nov. 3, 2006), 3 pgs.
"Written Opinion of the International Searching Authority for corresponding PCT Application No. PCT/US2006/022198", (Nov. 3, 2006),5 pgs.
"International Application Serial No. PCT/US2006/022198, Preliminary Report on Patentability, received Jan. 10, 2008", 6 pgs.
"Taiwanese Application Serial No. 95120572, Office Action mailed Jul. 11, 2009", 18 pgs.

* cited by examiner

*Primary Examiner*—Alford W Kindred
*Assistant Examiner*—Richard Franklin
(74) *Attorney, Agent, or Firm*—Schwegman, Lundberg & Woessner, P.A.

(57) ABSTRACT

A core of a network includes a storage unit to store a plurality of parameters to receive and transmit data packets in a communication system. A program controls transfer of the data packets between the core and a network node. The plurality of parameters in the storage unit controls the receiving and transmitting.

26 Claims, 4 Drawing Sheets

| IOTagIndex (Y BITS) | CONTROL | | | | | | | STATUS | | | | |
|---|---|---|---|---|---|---|---|---|---|---|---|---|
| 0 | | | | | | | | | | | | |
| 1 | | | | | | | | | | | | |
| 2 | | | | | | | | | | | | |
| 3 | | | | | | | | | | | | |
| - - - | | | | | | | | | | | | |
| - - - | | | | | | | | | | | | |
| - - - | | | | | | | | | | | | |
| $2^Y - 1$ | 101 | 102 | 103 | 104 | 105 | 106 | 107 | 111 | | | 112 | 113 |

FIG. 2

APPARATUS AND METHODS TO REDUCE FRAME INTERRUPTS IN PACKET-BASED COMMUNICATION

BACKGROUND

The inventive subject matter pertains to communication systems and, more particularly, to methods and apparatus to provide packet protocol engines.

Communication systems receive and transmit data to support voice and data communication. Data packets are transmitted and received between nodes of the communication system. These data packets may be bundled into data frames for efficiency of transmission.

Typically, each node of the communication system employs an interrupt arrangement to drive the processing for transmission and reception of the data packets. When an interrupt occurs, basic communication system processing is temporarily stopped. The data transmission and reception operations generating the interrupt are performed for a data frame of data packets before basic communication system processing is resumed. As a result, basic processing of the communication system is slowed.

BRIEF DESCRIPTION OF THE DRAWINGS

FIG. 2 is a layout of a job table in accordance with various embodiments of the present invention.

DETAILED DESCRIPTION

Figure 1:
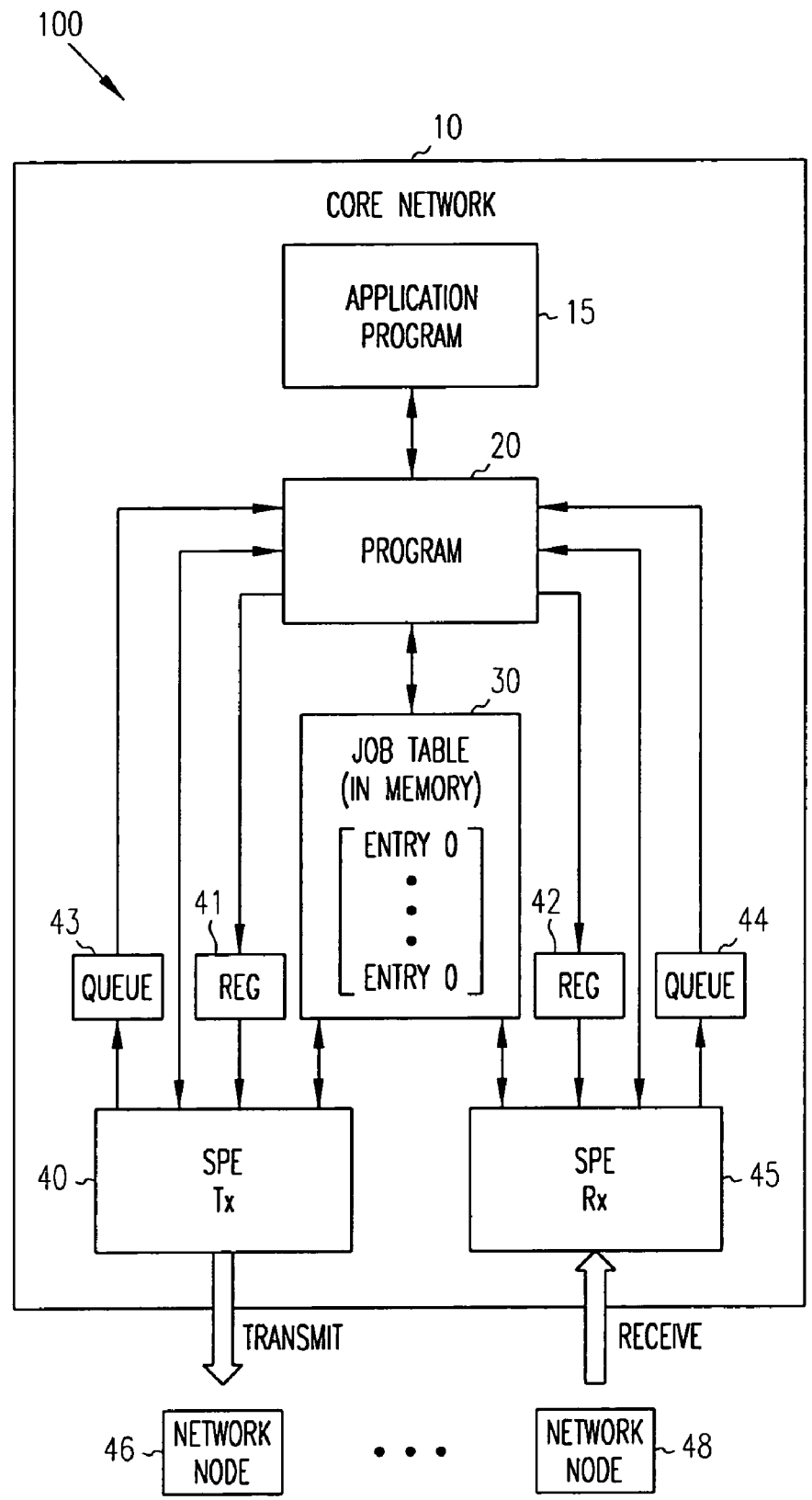
FIG. 1 is a block diagram of a packet protocol engine in accordance with various embodiments of the present invention.

FIG. 1 is a block diagram of a packet protocol engine in accordance with various embodiments of the invention. A communication system 100 is depicted as including a core network 10 and network nodes 46-48, for example. Communication system 100 may be a packet data based system for transferring data packets to support voice, data and other communication protocols.

Core network 10 has an application program 15 that supports the voice, data and Internet communications mentioned above. Application program 15 is coupled to a program 20. Program 20 may be implemented in firmware in some embodiments. Program 20 includes machine-readable information to enable the functions mentioned herein. Program 20 interfaces between the application program 15 and job table 30 to support the transfer of data packets and frames of data packets. Job table 30 may include a storage unit to read and to write data from and to the storage unit, as well as control information and status information relative to a data transfer. Job table 30 may include a random access memory (RAM), flash memory, and/or other types of fast-acting read/write memories.

In various embodiment of the invention, program 15 and storage unit or job table 30 may be implemented together on one semiconductor device (i.e., a "chip"). Alternatively in various other embodiment of the invention, program 15 and storage unit 30 may be implemented on separate semiconductor devices forming a family of chips called a "chip set". The single semiconductor device or chip set may be implemented on semiconductor device(s) fabricated by various technologies known to those of ordinary skill in the art such as silicon, gallium arsenide, etc.

Job table 30 may have a plurality of entries for a plurality of separate input/output (I/O) transfers. That is to say, the program 20 and job table 30 may support a number of separate I/O transfers, receptions and/or transmission of data packets in frames of data packets, between the application program 15 and the network nodes 46-48 of the communications system 100.

Program 20 controls each receive and transmit data packet transfer via a plurality of parameters stored in storage unit or job table 30. Program 20 sets the plurality of parameters into job table 30 to control the data transfer (receiving and transmitting) operations.

Core network 10 may also include a simple protocol engine (SPE) 40 and 45. The SPE 40 and 45 transmits and receives, respectively, the data packets in frames between the network nodes 46-48 of communication system 100 and the application program 15 of core network 10. The SPE 40 utilizes the plurality of parameters stored in job table 30 by the program 20 for a transmit operation to the network nodes 46-48. For receive operations by SPE 45 from network nodes 46-48, SPE 45 sets the plurality of receive parameters into job table 30 at the appropriate places.

The job table 30 is entered via an I/O tag index to store or set the parameters as well as to read out and use previously set parameters by either the program 20 for receive operations or the SPE 40 for transmit operations.

Core network 10 may also include registers 41 and 42 and queues or completion RAMs (random access memories) 43 and 44. Registers 41 and 42 may be used to store an interrupt frame count. The interrupt frame count is set by the program 20 and read by the appropriate SPE 40 and 45. It indicates when the SPE 40 and 45 are to generate the interrupt to the software 30. Queues or completion RAMs 43 and 44 may be hardware memory devices which identify the source (I/O tag) for which a read or write operation is accomplished. The queues 43 and 44 are set with the identity of the interrupt source by the appropriate SPE 40 or 45 and read out by the software 20.

FIG. 2 is a layout of a job table 30 in accordance with various embodiments of the invention. Job table 30 may be implemented in a storage unit and may reside in a RAM memory at a programmable base address. The table may have any number of fields, although three are shown as 31-33. The first field is an I/O tag index 31. The second field is a control field 32. The third field is a status field 33. Each of the three fields 31-33 may be indexed via the table base+the I/O tag index, which is the location in the job table 30 for the particular operation (receive or transmit).

The I/O tag index 31 is a value of the current index into the job table 30. Y-bits may be allowed for the table, each of the Y-bits representing a separate receive or transmit operation to be controlled by job table 30. Y represents a number of less than or equal to the number of operations allowed by the core network 10.

The next field of job table 30 is the control field 32. The control field 32 may be 32 bits in width. Each of these bits provides some information to control the transmit or receive operations.

Field 101 of control field 32 may be a valid flag bit that indicates the entry (I/O tag index) is valid and in use. This is a synchronization bit to avoid race conditions between program 20 and SPE 40, 45. The program 20 sets the bit equal to a "1", and SPE 40 and 45 decode it to determine that the entry is ready for processing. The bit is cleared when processing is complete.

Field 102 is a direction flag (DirFlag) that indicates the frame direction. That is, DirFlag=1 indicates a send or transmit operation; and DirFlag=0 indicates a receive operation.

Field 103 is a check/order field that indicates whether the SPE 45 should raise an error indicator, if frames are received out of order. Field 103 may apply to certain protocols and will be a reserved bit for other protocols.

Field 104 is a check/non-full frame that indicates whether SPE 45 should raise an error indicator, if a frame (other than the last one in a sequence) does not include the maximum number of bytes normally expected in a frame specified by the communication protocol in use.

Field 105 is a total size field for receiving or transmitting data. The total transmit/receive data size for this I/O is measured in dwords. Dwords are double words, usually referring to a 4-byte (32-bit) quantity. The field 105 allows for many bytes of information per entry. Field 105 may be equivalent to field 111 in length. Field 111 will be explained later.

Field 106 is an interrupt frame count. Field 106 indicates the number of frames to transmit or receive before generating an interrupt. Field 106, in another embodiment, may be accomplished via registers 41 and 42 corresponding to transmit or receive operations. The registers 41 and 42 would apply to all entries in the job table 30. In this alternate embodiment, the bit bits of field 106 may take on other uses. Field 106 allows for up to $2^n$ frames to be transmitted before an interrupt is generated, where n is the number of bits in field 106. Typical arrangements generate an interrupt for each frame. The interrupt frame count field 106 should be the same length as field 112. Field 112 will be explained later.

Field 107 is an upper tag field. This is the upper portion of the I/O Tag in a frame header (not shown). The upper tag+I/O Tag Index constitute the full I/O Tag. The value of these bits is specific to an implementation. The only requirement is that the I/O Tag should be unique across all I/O tags within the job table 30.

The status field 33 may be 32 bits in width. Each of these bits provides some information for the transmit or receive operation status.

The first field 111 of the status field 33 is the size-remaining field. Field 111 is the remaining number of dwords for this I/O operation. The total size is expressed in dwords. Dwords are double words, usually referring to a 4-byte (32-bit) quantity. Field 111 may be the same length as field 105.

Field 112 is the interrupt frame count remaining. This is the number of frames remaining until an interrupt should be generated under normal conditions. The value of field 112 starts at the interrupt frame count and decrements by one for each frame of data packets received or sent. This field will be zero when the size remaining is zero. Field 112 may be the same length as field 106.

Field 113 is an error status field. Field 113 is an encoded status field for error reporting. For a successful transmission/reception of all data frames for a given I/O tag, the status should equal zero.

It will be understood that although field layouts for fields 31-33 are shown, the layout of the fields may be in any order, and the sizes of fields 31-33 and their constituents may be of any suitable size.

Figure 3:
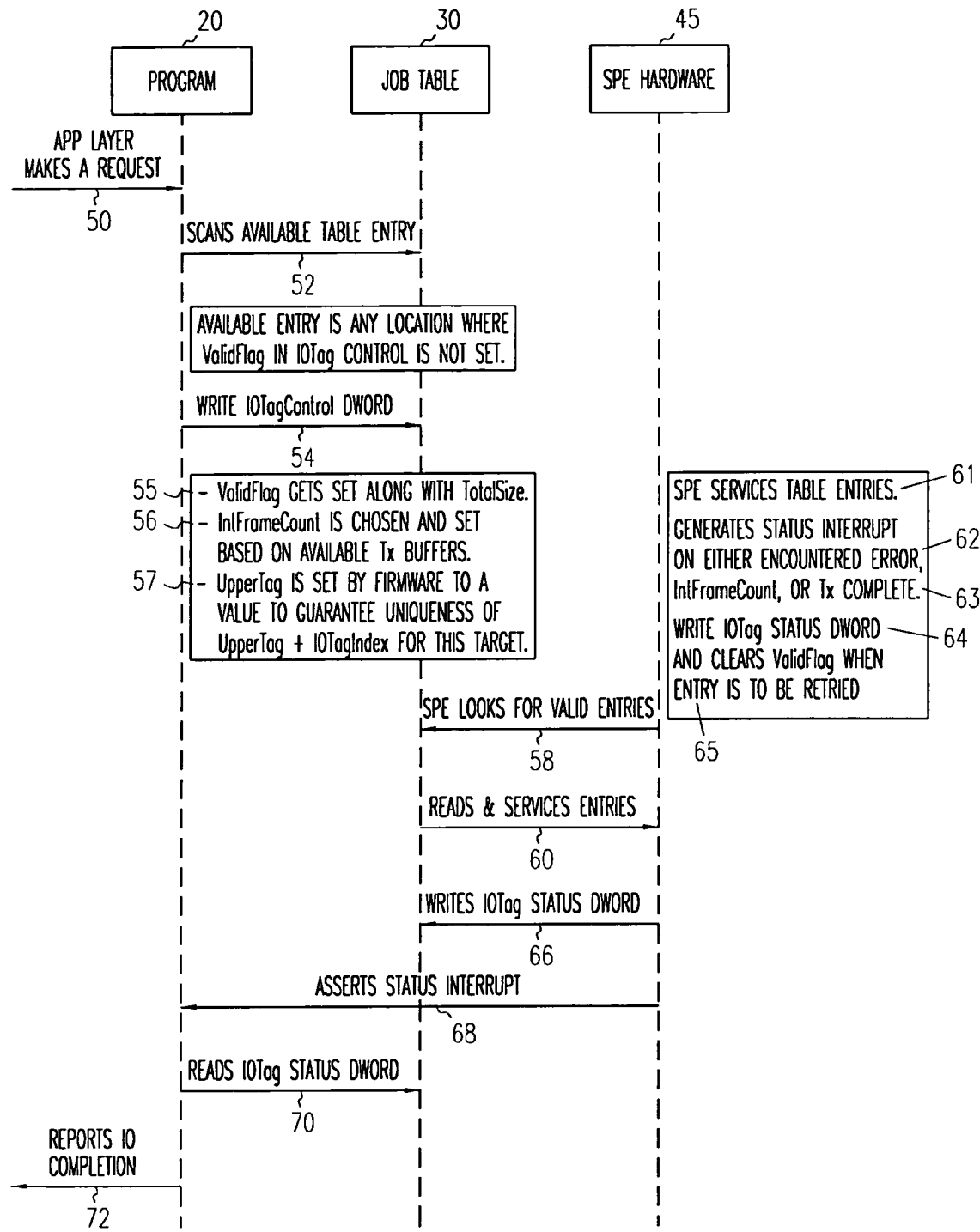
FIG. 3 is a data flow chart of a method for data reception in accordance with various embodiments of the present invention.

FIG. 3 is a data flow chart of a method for data transmission in accordance with various embodiments of the invention. The program 20, job table 30 and SPE 40 are shown across the top of the data flow chart. One or more methods may be implemented by firmware, software and/or hardware or any combination of these implementations.

An application program 15 (refer back to FIG. 1), for example, generates a request 50 for data packet transmission to program 20. In response to the request 50, program 20 scans the job table for an available or currently unused entry 52 where available also requires that the I/O is suitable for acceleration. That is, the I/O size should be less than the maximum allowable by entries in the job table 30. An available entry in job table 30 is any location (I/O tag index) where a valid flag 101 (refer back to FIG. 2) in the control field 32 is not set. Program 20 writes 54 the control field 32 of the job table 30 with the total size in field 105 (refer to FIG. 2) of the transmission request in dwords. Dwords are double words, usually referring to a 4-byte (32-bit) quantity.

Program 20 sets 55 the valid flag 101 and the total size 105 fields. The interrupt frame count field 106 (FIG. 2) is selected and set 56 by program 20. In another embodiment, program 20 may set registers 41 and 42 corresponding to transmit or receive operations to substitute for field 106, as explained supra. This field 106 allows many frames of data to be transferred before an interrupt is generated, thereby maximizing the efficiency of program 20 and minimizing the overhead of core network 10.

The upper tag field 107 (FIG. 2) is set 57 to a value equal to the upper tag combined with the I/O tag index for the particular transmission. The SPR 40 scans 58 for valid entries in the job table 30. These scans may be from top to bottom of the job table; bottom to top of the job table 30; or from an entry that was last handled. Various other search techniques may also be used. SPE 40 begins to read 60 entries from job table 30. SPE 40 services 61 the job table entries. The entries to be serviced have their respective valid flag 101 set.

Based on the job table 30 values for the interrupt frame count 106 and any error encountered, which are indicated in error status field 113 of field 33 (FIG. 2), SPE 40 may generate an interrupt. The interrupt may indicate that an error was encountered 62 or that the interrupt frame count was achieved and/or the transmission is normally completed 63.

Further the SPE 40 writes 64 the I/O status error status field 113 (FIG. 2). SPE 40 clears 65 the valid flag field 101. SPE 40 writes 66 the status into field 113 of status field 33.

SPE 40 generates and asserts 68 a status interrupt to program 20 indicating that the transmit operation is completed or that there is an error, and the error status field 113 indicates the type of error found. In order to prevent program 20 from having to search the entire job table 30, queues 43 and 44 will provide an identity of what job was completed. These queues 43 and 44 may be indexed by I/O tag.

Program 20 reads 70 the status from field 113 to determine whether the transmission operation is normally completed or whether an error occurred and the type of error may be indicated in field 113. Program 20 reports 72 that the transmission is normally completed, or it reports that an error occurred and the status of the error to application program 15. As a result, a particular transmission operation is ended. It is to be understood that the above method may be continually repeated for each transmission type operation.

Figure 4:
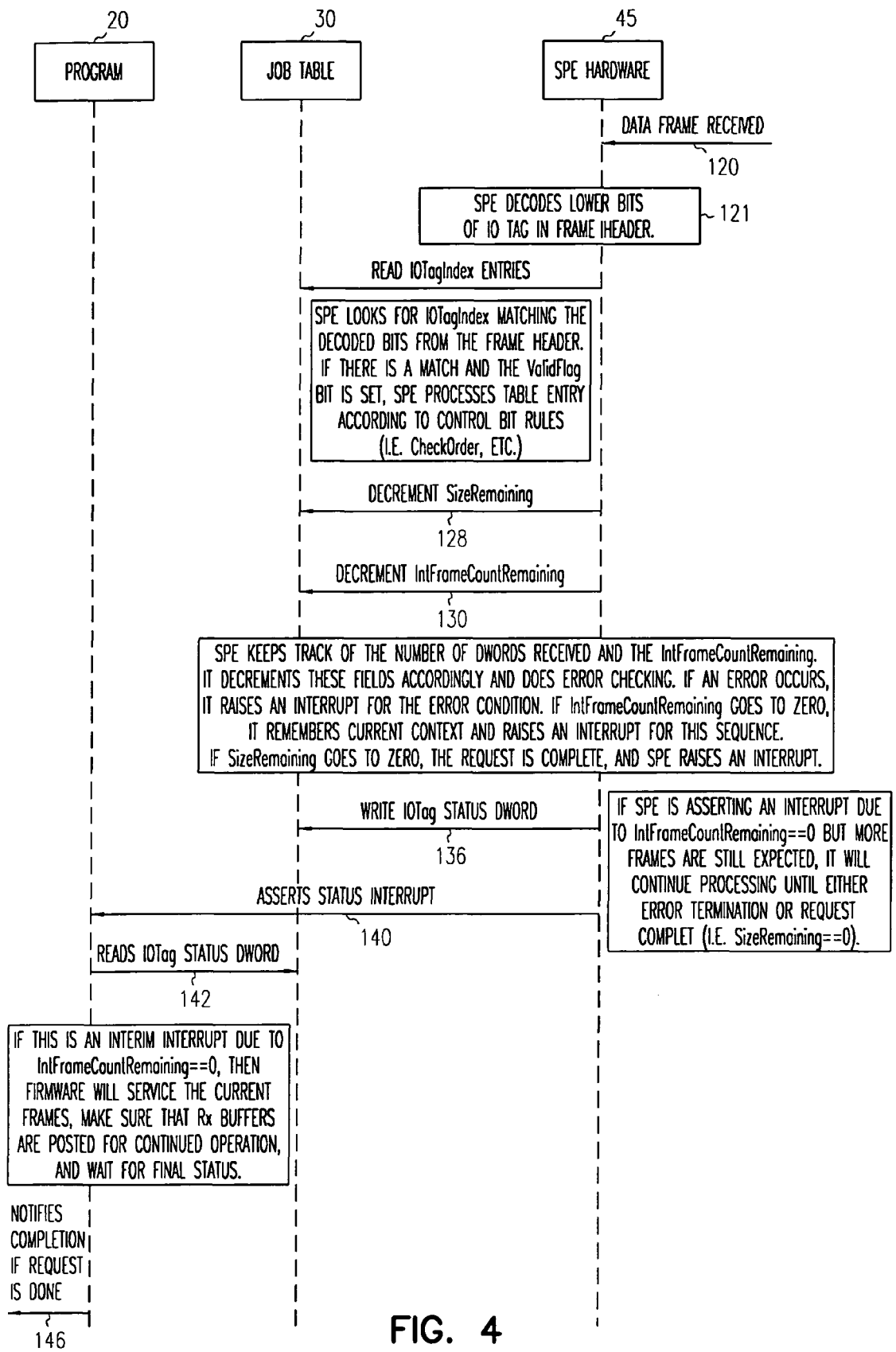
FIG. 4 is a data flow chart of a detailed method for data transmission in accordance with various embodiments of the present invention.

FIG. 4 is a data flow chart of a detailed method for data reception operation in accordance with various embodiments of the invention. The SPE receiver 45 (refer back to FIG. 1) receives 120 one or more data packet frames. The SPE receiver 45 decodes 121 lower bits of an I/O tag in a frame header (not shown). Then the SPE receiver 45 reads 122 the I/O tag index of the job table 30 entries. The SPE receiver 45 scans 123 for an I/O tag index matching the decoded lower bits of the frame header.

If the I/O tag index and lower bits of the header match 124, and if the valid flag 101 is set 125, SPE receiver 45 performs job table 30 entry encoding 126 according to the control field 32. That is, the check order indicator field 104 and check non-full frame indicator field 105 are used to guide the data packet reception.

The SPE receiver 45 decrements 128 the size remaining field 111 of status field 33. The SPE receiver 45 also decrements 130 the interrupt frame count remaining field 112.

The SPE receiver 45 tracks 131 the size remaining (in the receive mode, the number of dwords received) 111 and the interrupt frame count remaining 112 (refer back to FIG. 2). SPE receiver 45 decrements 132 status fields 111 and 112 and performs error checking on the data packet reception.

If an error occurs, SPE receiver 45 generates 133 an interrupt with the error status field 113 (refer back to FIG. 2) indicating the type of the error detected. If the interrupt frame count remaining field 112 becomes zero, SPE receiver 45 generates 134 an interrupt for this condition and may set the appropriate queue entry with the identity of the I/O tag which has the error. If the size remaining field 111 becomes zero, the receive request is normally complete, and SPE receiver 45 generates 135 an interrupt.

The SPE receiver 45 writes 136 the size remaining field 111 of job table 30 with the number of dwords actually received in field 111. If the SPE receiver 45 is asserting an interrupt due to the interrupt frame count remaining equal to zero, but more frames are expected, SPE receiver 45 continues processing 138 received data packets until either an error termination occurs or the receive request is completed; that is, the size remaining field 111 becomes equal to zero. The SPE receiver 45 generates and asserts 140 a status interrupt, which is passed to program 20. Registers 41 and 42 may include a threshold value which if exceeded will indicate the storage buffers with the SPEs 40 and 45 are near filled and data may be lost as a result. Program 20 may set the threshold and the appropriate SPE 40 and 45 will read the threshold and generate an immediate interrupt when the threshold is met and identify the I/O tag which caused the threshold to be met or exceeded.

In other embodiments, an interrupt may be generated for normal completion of the receive or transmit operations, an occurrence of an error, and the interrupt frame count as mentioned above.

Program 20 reads 142 the I/O Tag status dword from job table 30. If the latest interrupt is an intermediate one due to the interrupt frame count remaining field 112 being zero, program 20 will service 143 the current frames of data packets. Program 20 then indicates 144 that the receive buffers (not shown) are to operate continuously. Program 20 waits 145 for a final status of the receive operation. And when the receive operation is normally completed, the program 20 notifies 146 the application program 15 that the receive operation is completed.

As can be observed from the above description, the various embodiments of the invention provide for improved performance of the send and receive operations by not requiring a system to handle an interrupt for every frame of data packets transmitted or received by an application program 15. Large data transfers may benefit from the above embodiments.

It will be understood that the transmit and receive methods of FIGS. 3 and 4 may be performed continuously.

The Abstract is provided to comply with 37 C.F.R. §1.72(b) requiring an Abstract that will allow the reader to ascertain the nature of the technical disclosure. It is submitted with the understanding that it will not be used to interpret or limit the scope or meaning of the claims.

In the foregoing Detailed Description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. Individual claims may encompass multiple embodiments of the inventive subject matter.

Although some embodiments of the invention have been illustrated, and those forms described in detail, it will be readily apparent to those skilled in the art that various modifications may be made therein without departing from the spirit of these embodiments or from the scope of the appended claims.

What is claimed is:

1. A device comprising:
   a storage unit to store a plurality of parameters to control receiving and transmitting data packets;
   a program coupled to the storage unit, the program to control a transfer of the data packets between the device and a node via the storage unit; and
   a job table within the storage unit to store the plurality of parameters, wherein the job table comprises
      an input/output (I/O) tag index field, wherein the I/O tag index field identifies a location within the job table of a particular receive or transmit operation;
      a control field comprising
         a valid flag;
         a direction flag;
         a check/order field;
         a check/non-full frame field;
         a total size field;
         an interrupt frame count field to indicate a number of frames of the data packets; and
         an upper tag field; and
      a status field comprising
         a size-remaining field;
         an interrupt frame count remaining field; and
         an error status field.

2. The device as claimed in claim 1, wherein the storage unit and the program are included on a single semiconductor device.

3. The device as claimed in claim 1, wherein the storage unit and the program are included on separate semiconductor devices.

4. The device as claimed in claim 1, wherein the storage unit includes a control memory including the plurality of transmission parameters for each of a plurality of data packet transmissions.

5. The device as claimed in claim 1, wherein the storage unit includes a control memory including the plurality of receiving parameters for each of a plurality of data packets for reception.

6. The device as claimed in claim 1, wherein the program and the storage unit are coupled to a protocol engine, and wherein the protocol engine is to transmit data packets to the node and to receive data packets from the node.

7. The device as claimed in claim 6, wherein there is further included:
   a queue coupled to the program and to the protocol engine to store an identity of a source of receiving and transmitting data packets; and
   a register to store the interrupt counter.

8. A system comprising:
an application program to process data packets including receive data and transmit data;
a storage unit to store a plurality of parameters to control receiving and transmitting the data packets between the application program and at least one network node;
a first program to set into the storage unit and to read from the storage unit the plurality of parameters; and
the first program to control the receive data and the transmit data via the plurality of parameters in the storage unit,
wherein the storage unit includes a control memory including a total size indicator; and
wherein the storage unit further includes a status memory including an interrupt frame count remaining indicator; and
a job table within the storage unit to store the plurality of parameters, wherein the job table comprises
an input/output (I/O) tag index field, wherein the I/O tag index field identifies a location within the job table of a particular receive or transmit operation;
a control field comprising
a valid flag;
a direction flag;
a check/order field;
a check/non-full frame field;
an interrupt frame count field to indicate a number of frames of the data packets; and
an upper tag field; and
a status field comprising
a size-remaining field; and
an error status field.

9. The system as claimed in claim 8, wherein there is further included a protocol engine coupled to the at least one network node, to the storage unit, and to the first program, the protocol engine to interpret the plurality of parameters to read the receive data and to transmit the transmit data.

10. A method comprising:
transferring data packets between a core and a node of a communication system;
controlling the transferring of the data packets by a storage unit to store a plurality of parameters to receive and to transmit frames of the data packets; and
providing a job table within the storage unit to store the plurality of parameters, wherein the job table comprises
an input/output (I/O) tag index field, wherein the I/O tag index field identifies a location within the job table of a particular receive or transmit operation;
a control field comprising
a valid flag;
a direction flag;
a check/order field;
a check/non-full frame field;
a total size field;
an interrupt frame count field to indicate a number of frames of the data packets; and
an upper tag field; and
a status field comprising
a size-remaining field;
an interrupt frame count remaining field; and
an error status field.

11. The method of claim 10, the controlling including setting by a program the plurality of parameters into the storage unit to control the transmission of the frames.

12. The method of claim 11, the controlling further including:
scanning by a protocol engine the storage unit to transmit the frames; and
initiating by the protocol engine transmission of the frames to the node.

13. The method of claim 12, the controlling further including:
determining when the number of the frames are transmitted; and
writing to the storage unit a transmission complete indication when the number of the frames are transmitted.

14. The method of claim 13, the controlling further including generating by the protocol engine an interrupt in response to the transmission complete indication.

15. The method of claim 10, the controlling including setting by a program the plurality of parameters into the storage unit job table to control the receipt of the frames.

16. The method of claim 15, the controlling further including setting by the protocol engine the plurality of parameters into the storage unit job table in response to a receipt of the frames from the node.

17. The method of claim 16, the controlling further including selecting by the protocol engine an entry within the storage unit job table to store the frames.

18. The method of claim 17, the controlling further including generating an interrupt by the protocol engine when receipt of the frames is completed.

19. The method of claim 18, wherein when an error condition is detected during the receipt of the frames, the controlling further including:
setting an error indication in the storage unit job table; and
generating the interrupt by the protocol engine.

20. The method of claim 10, wherein there is further included generating an interrupt when a threshold of the number of frames received exceeds a threshold parameter, the interrupt corresponding to a buffer shortage.

21. A machine-accessible medium having associated instructions, wherein the instructions, when accessed, result in a machine performing:
setting a plurality of parameters into a job table within a storage unit, wherein the plurality of parameters are to control the transfer of data packets, and wherein the job table comprises
an input/output (I/O) tag index field, wherein the I/O tag index field identifies a location within the job table of a particular receive or transmit operation;
a control field comprising
a valid flag;
a direction flag;
a check/order field;
a check/non-full frame field;
a total size field;
an interrupt frame count field to indicate a number of frames of the data packets; and
an upper tag field; and
a status field comprising
a size-remaining field;
an interrupt frame count remaining field; and
an error status field; and
utilizing the plurality of parameters by a protocol engine to transfer the data packets between an application program of a core network and at least one node of a communication system.

22. The machine-accessible medium of claim 21, the setting including writing by a first program the plurality of parameters into the storage unit job table.

23. The machine-accessible medium of claim 21, the setting including writing by the protocol engine the plurality of parameters into the storage unit job table.

24. The machine-accessible medium of claim 21, the utilizing including reading by the protocol engine the plurality of parameters from the storage unit job table.

25. The machine-accessible medium of claim 21, wherein there is further included writing by the protocol engine status information to the storage unit job table.

26. The machine-accessible medium of claim 21, wherein there is further included generating an interrupt for at least one of:

completing a data packet transmission;
reaching an indicated frame count;
completing a data packet reception; and
detecting a data packet receive or data packet transmit error.

* * * * *